US 8,190,896 B2

(12) United States Patent
Ryu

(10) Patent No.: US 8,190,896 B2
(45) Date of Patent: May 29, 2012

(54) CONDITIONAL ACCESS FOR A MULTIMEDIA BROADCAST SERVICE USING A WIRELESS TERMINAL

(75) Inventor: Song-Pil Ryu, Seoul (KR)

(73) Assignee: LG Electronics Inc., Seoul (KR)

( * ) Notice: Subject to any disclaimer, the term of this patent is extended or adjusted under 35 U.S.C. 154(b) by 1039 days.

(21) Appl. No.: 11/283,127

(22) Filed: Nov. 18, 2005

(65) Prior Publication Data
US 2006/0115084 A1 Jun. 1, 2006

(30) Foreign Application Priority Data
Nov. 19, 2004 (KR) .......... 10-2004-0095231

(51) Int. Cl.
H04L 29/06 (2006.01)
(52) U.S. Cl. .......... 713/171; 380/255; 380/278
(58) Field of Classification Search .......... 713/171; 380/247, 255, 278
See application file for complete search history.

(56) References Cited

U.S. PATENT DOCUMENTS

| | | | |
|---|---|---|---|
| 7,099,479 B1* | 8/2006 | Ishibashi et al. | 380/281 |
| 7,624,284 B2* | 11/2009 | Lahey et al. | 713/193 |
| 2002/0010927 A1* | 1/2002 | Kim | 725/40 |
| 2002/0054087 A1* | 5/2002 | Noll et al. | 345/744 |
| 2002/0066097 A1* | 5/2002 | Hattori et al. | 725/34 |
| 2003/0185398 A1* | 10/2003 | Hypponnen | 380/277 |
| 2005/0091683 A1* | 4/2005 | Sheynman et al. | 725/34 |
| 2005/0289586 A1* | 12/2005 | Park et al. | 725/31 |
| 2006/0104237 A1* | 5/2006 | Ryu | 370/328 |
| 2006/0111109 A1* | 5/2006 | Kim | 455/436 |
| 2006/0177114 A1* | 8/2006 | Tongdee et al. | 382/128 |
| 2007/0198414 A1* | 8/2007 | Derrenberger | 705/51 |

FOREIGN PATENT DOCUMENTS

| | | |
|---|---|---|
| CN | 1236517 | 11/1999 |
| CN | 1333520 | 1/2002 |
| EP | 0804012 | 10/1997 |
| JP | 2004-236136 | 8/2004 |
| WO | 02-03728 | 1/2002 |
| WO | 03-036908 | 5/2003 |
| WO | 03-045064 | 5/2003 |
| WO | 2003/085959 | 10/2003 |
| WO | 2004/030363 | 4/2004 |

OTHER PUBLICATIONS

Nidd et al. "CA-PK: conditional access for broadcast networks", Software—Practice & Experience archive, vol. 33, Issue 5 (Apr. 2003), Special issue: Security software, pp. 481-496, ISSN: 0038-0644, publisher John Wiley & Sons, Inc.*
Zhang et al. "A flexible content protection system for media-on-demand" proceeding of the IEEE fourth international symposium on Multimedia Software Engineering, Dec. 11-13, 2002, Piscataway, NJ, USA, pp. 272-277.* European Telecommunications Standards Institute (ETSI), "Radio Broadcasting Systems; Digital Audio Broadcasting (DAB) to Mobile, Portable and Fixed Receivers," ETSI EN 300 401 v1.3.3, May 2001, XP-014001360.
F. Kozamernik, "Digital Audio Broadcasting (DAB)—From Digital Radio towards Mobile Multimedia," EBU Technical Review, Jan. 2004, XP-002432803.
R. Rebhan et al., "Multimedia Goes Mobile in Broadcast Networks," IEEE Multimedia, vol. 4, No. 2, Apr. 1997, XP-002572315.

* cited by examiner

Primary Examiner — Hadi Armouche
(74) Attorney, Agent, or Firm — Lee, Hong, Degerman, Kang & Waimey

(57) ABSTRACT

A method for decrypting digital multimedia broadcasting data in a mobile communication terminal. The method includes receiving encrypted digital multimedia broadcasting data though a broadcasting network, receiving at least one key for decrypting the encrypted digital multimedia broadcasting data through a wireless communication network, decrypting the received encrypted digital multimedia broadcasting data using the received at least one key, and displaying broadcast content that corresponds to the decrypted digital multimedia broadcasting data.

23 Claims, 4 Drawing Sheets

CONDITIONAL ACCESS FOR A MULTIMEDIA BROADCAST SERVICE USING A WIRELESS TERMINAL

CROSS-REFERENCE TO RELATED APPLICATIONS

Pursuant to 35 U.S.C. §119(a), this application claims the benefit of earlier filing date and right of priority to Korean Application No. 2004-95231, filed on Nov. 19, 2004, the contents of which is hereby incorporated by reference herein in its entirety.

FIELD OF THE INVENTION

The present invention relates to digital multimedia broadcasting, and more particularly, to conditional access for receiving a broadcast service in a wireless communication system.

BACKGROUND OF THE INVENTION

Generally, digital multimedia broadcasting (DMB) refers to a broadcasting service for providing various multimedia data and signals, such as high-quality voice and image data, in a digital manner to a device having a DMB receiver, even when the device is mobile. Examples of such a device include a personal digital assistant (PDA), a terminal for a vehicle and a mobile terminal. The DMB may be divided into a terrestrial DMB (TDMB) and a satellite DMB (SDMB) according to how signals including digital broadcasting data are transmitted.

According to the TDMB, a user may receive airwave broadcasts free of charge without an additional subscription procedure because the TDMB does not provide for requirements or specifications for conditional access. Thus, the TDMB does not practice providing specific pay broadcast services to limited users based on conditional access.

On the contrary, the SDMB implements paid broadcast services and provides various high-quality image data, audio data, or broadcasting data through specified DMB channels. That is, a satellite broadcast or a cable broadcast activates pay subscribers or pay channels to allow corresponding subscribers to receive corresponding broadcast services. In that case, broadcast signals that were converted into an encrypted format by a conditional access system (CAS) can be restored back to its original state using an appropriate device, such as a set-top box. The restoration function is applied to the SDMB, thus a SDMB receiver is provided with functions related to the CAS therein.

However, attempts to include the functions related to the CAS into a TDMB receiver has been problematic. For example, a large memory capacity is necessary, and a dedicated application (software, hardware, and/or a combination thereof) is to be developed. Also, a booting system (software, hardware, and/or a combination thereof) is to be designed to provide security. Accordingly, the functions related to the CAS, as applied to the SDMB receiver, cannot be integrally applied to the TDMB receiver.

Moreover, the related art TDMB, which practices free-of-charge broadcasting, does not provide a specification for conditional access. Hence, the TDMB does not consider a demand for transmitting or receiving high-quality broadcasts. In an attempt to solve the problem, the CAS of the SDMB was applied to the TDMB. However, the result was unfavorable because an expensive dedicated system being applied to the TDMB receiver through a complicated design modification was required.

SUMMARY OF THE INVENTION

The present invention is directed to conditional access for receiving a broadcast service in a wireless communication system.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method for receiving a broadcast service in a wireless communication system, the method comprising requesting reception of a service from a wireless cellular communication network, receiving at least one encryption key from the wireless cellular communication network for decrypting encrypted service data, wherein the at least one encryption key is generated by a non-cellular broadcast station, receiving the encrypted service data from the non-cellular broadcast station, the encrypted service data having at least one encryption key, decrypting the encrypted service data if the at least one encryption key received from the wireless cellular communication network matches the at least one encryption key of the encrypted service data; and providing the decrypted service data.

In one aspect of the invention, the method further comprises monitoring fee charging information related to providing the decrypted service data and providing the fee charging information to a fee charging authority to allow a fee to be charged based on the fee charging information.

In another aspect of the invention, the method further comprises blocking the encrypted service data from being decrypted if the at least one encryption key received from the wireless cellular communication network does not match the encryption key of the encrypted service data.

Preferably, the fee charging authority is at least one of the wireless cellular communication network and the non-cellular broadcasting station. The at least one encryption key is based on a Public Key Infrastructure. The encrypted service data is compression image data.

Preferably, the encryption key is inserted into a specific part of a corresponding frame or a specific data header of the encrypted service data to encrypt the service data. The encrypted service data is decrypted using a conditional access function of Eureka-147.

Preferably, the non-cellular broadcasting station periodically updates the encryption key and inserts the updated encryption key into the service data to update the encryption of the service data before transmitting to a receiver. A period for updating the encryption key comprises at least one of a day, a morning, an afternoon, an evening, and a unitary time.

Preferably, the at least one encryption key is received in a short message service (SMS) format. The at least one encryption key is for decrypting, for a certain time, requested encrypted service data.

In a further aspect of the invention, the step of requesting reception of a service from a wireless cellular communication network comprises at least one of requesting a specific TDMB program and requesting a specific TDMB channel.

Alternatively, the step of requesting reception of a service from a wireless cellular communication network comprises requesting the service as a time unit.

In another aspect of the invention, the method further comprises extracting the at least one encryption key from a short message service (SMS) message prior to decrypting the encrypted service data.

Preferably, the step of monitoring fee charging information comprises counting a time duration for receiving the decrypted service data. Alternatively, the fee to be charged is based on at least one of a number of times the decrypted service data is provided and a number of channels the decrypted service data is provided on.

In another embodiment of the present invention, a mobile communication terminal for receiving a broadcast service comprises a transmitter for transmitting signals to at least one network, a receiver for receiving signals from the at least one network, and a processor cooperating with the transmitter and the receiver for requesting reception of a service from a wireless cellular communication network, receiving at least one encryption key from the wireless cellular communication network for decrypting encrypted service data, wherein the at least one encryption key is generated by a non-cellular broadcast station, receiving the encrypted service data from the non-cellular broadcast station, the encrypted service data having at least one encryption key, decrypting the encrypted service data if the at least one encryption key received from the wireless cellular communication network matches the at least one encryption key of the encrypted service data, and providing the decrypted service data.

In one aspect of the invention, the processor monitors fee charging information related to providing the decrypted service data and provides the fee charging information to a fee charging authority to allow a fee to be charged based on the fee charging information.

In another aspect of the invention, the encrypted service data is blocked from being decrypted if the at least one encryption key received from the wireless cellular communication network does not match the encryption key of the encrypted service data. Preferably, the fee charging authority is at least one the wireless cellular communication network and the non-cellular broadcasting station. The encryption key is based on a Public Key Infrastructure. The encrypted service data is compression image data.

Preferably, an encryption key is inserted into a specific part of a corresponding frame or a specific data header of the encrypted service data to encrypt the service data. The encrypted service data is decrypted using a conditional access function of Eureka-147.

Preferably, the non-cellular broadcasting station periodically updates the encryption key and inserts the updated encryption key into the service data to update the encryption of the service data before transmitting to a receiver. A period for updating the encryption key comprises at least one of, a day, a morning, an afternoon, an evening, and a unitary time.

Preferably, wherein the at least one encryption key is received in a short message service (SMS) format. The at least one encryption key is for decrypting, for a certain time, requested encrypted service data.

In a further aspect of the invention, the step of requesting reception of a service from at least one network comprises at least one of requesting a specific TDMB program and requesting a specific TDMB channel. Alternatively, the step of requesting reception of a service from at least one network comprises requesting the service as a time unit.

Preferably, the processor extracts the at least one encryption key from a short message service (SMS) message prior to decrypting the encrypted service data.

In another aspect of the invention, the processor monitors fee charging information by counting a time duration for receiving the decrypted service data. Alternatively, the fee to be charged is based on at least one of a number of times the decrypted service data is provided and a number of channels the decrypted service data is provided on.

In another embodiment of the present invention, a system for broadcasting a service in a wireless communication system comprises a non-cellular broadcasting station for generating at least one encryption key for decrypting encrypted service data, transmitting the at least one encryption key to a wireless cellular communication network and transmitting the encrypted service data to a mobile communication terminal, the wireless cellular communication network for receiving requests from the mobile communication terminal and transmitting the at least one encryption key received from the non-cellular broadcasting station to the mobile communication terminal, and the mobile communication terminal.

Preferably the mobile communication terminal is for requesting reception of a service from the wireless cellular communication network, receiving the at least one encryption key from the wireless cellular communication network for decrypting the encrypted service data, receiving the encrypted service data from the non-cellular broadcasting station, the encrypted service data having at least one encryption key, decrypting the encrypted service data if the at least one encryption key received from the wireless cellular communication network matches the at least one encryption key of the encrypted service data, and providing the decrypted service data;

Preferably, the mobile communication terminal monitors fee charging information related to providing the decrypted service data and provides the fee charging information to a fee charging authority to allow a fee to be charged based on the fee charging information.

Preferably, the mobile terminal blocks the encrypted service data from being decrypted if the at least one encryption key received from the wireless communication network does not match the at least one encryption key of the encrypted service data.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

The present invention relates to conditional access for receiving a broadcast service in a wireless communication system.

Reference will now be made in detail to some embodiments of the present invention, examples of which are illustrated in the accompanying drawings. The present invention may be implemented in a terrestrial digital multimedia broadcasting (TDMB) system. However, the present invention may also be applied to other various types of broadcasting systems, such as DVB-H.

The present invention is based on the fact that conditional access for TDMB data may be performed using a data transfer system, such as Eureka-147, which is a specification for multiplexing TDMB data. Preferably, in the present invention, when a broadcasting station transmits encrypted TDMB data, a user, upon paying a fee, may receive an encryption key from the broadcasting station through a mobile communication network for decrypting the encrypted TDMB data. Accordingly, a corresponding TDMB channel may be viewed. In order to implement the present invention, the user is first provided with a TDMB receiver for receiving the TDMB data. Second, a mobile communication terminal for receiving the encryption key from the mobile communication network is also provided. Hereinafter, a TDMB phone will be explained in more detail with reference to the attached drawings as an example of the mobile communication terminal having the TDMB receiver therein. However, it is understood that various other types of devices with terrestrial digital multimedia broadcasting capabilities may also be used.

Figure 1:
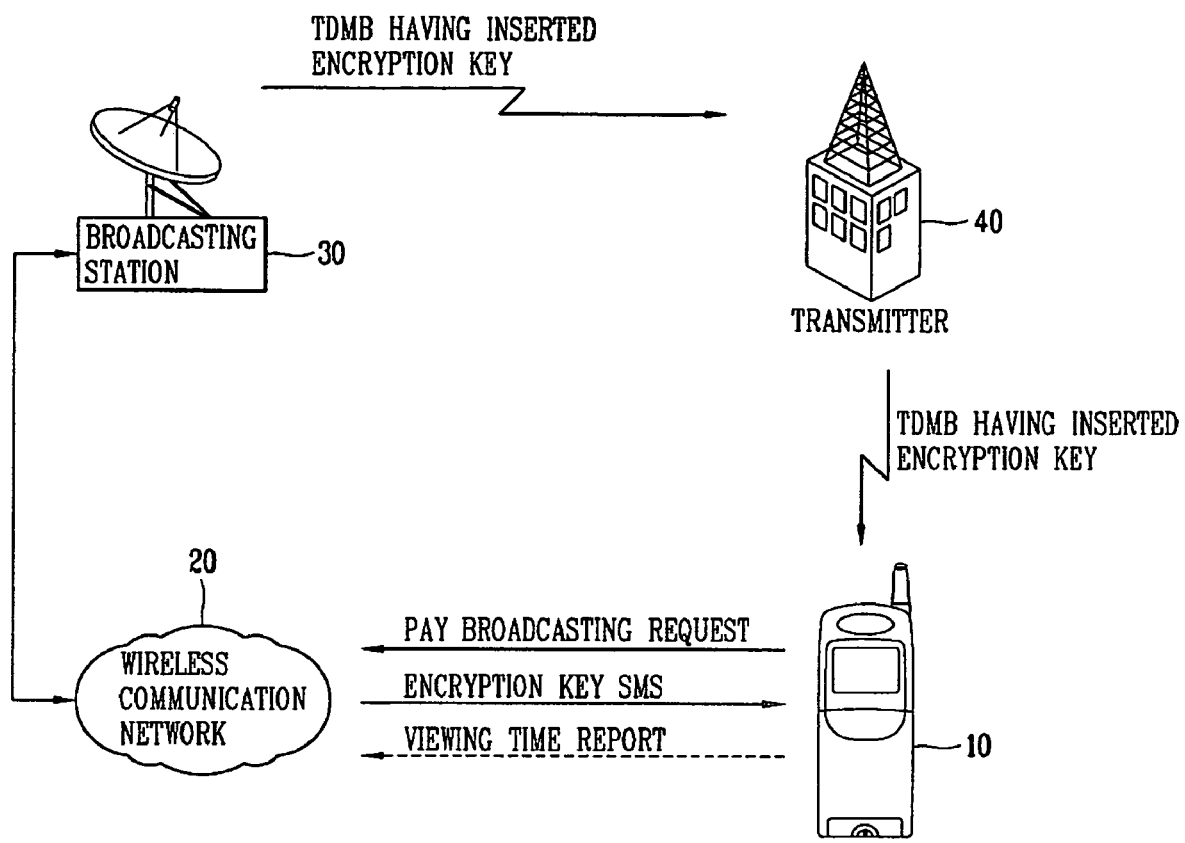
FIG. 1 illustrates a construction and operation of a terrestrial digital multimedia broadcasting (TDMB) system for charging a fee for broadcasting channel reception in accordance with a preferred embodiment of the present invention.

FIG. 1 illustrates a construction and operation of a terrestrial digital multimedia broadcasting (TDMB) system for charging a fee for broadcasting channel reception in accordance with one embodiment of the present invention. As shown in FIG. 1, the TDMB system comprises a broadcasting station 30, a terrestrial transmitter 40, a TDMB phone 10, and a wireless communication network 20.

The broadcasting station 30 encrypts TDMB data using a certain encryption key, and transmits the generated encrypted TDMB data to a TDMB network. Encryption key information for decrypting the encrypted TDMB data may be provided to a corresponding system of the wireless communication network 20 through a wireless interface. The TDMB transmitter 40 relays the encrypted TDMB data transmitted from the broadcasting station 30 to a TDMB receiver. The wireless communication network 20 provides encryption key information received from the broadcasting station 30 to the TDMB phone 10 that has requested the encryption key information. The encryption key information may be provided through the wireless communication network 20, preferably having a short message service (SMS) format, to the user of the TDMB phone 10, wherein the amount of information provided may be based on the user's request.

The TDMB phone 10 is a mobile communication terminal having a TDMB receiving function, and requests encryption key information for decrypting the encrypted TDMB data from the wireless communication network 20. The TDMB phone 10 then receives the requested encryption key information as an SMS format and decrypts the encrypted TDMB data using the encryption key information. Accordingly, a corresponding pay TDMB service may be viewed.

Specifically, encryption key information for decrypting the encrypted TDMB data is provided to the TDMB phone 10 to allow a user to view a corresponding pay TDMB service. Accordingly, various encryption keys may be generated and managed for the purpose of charging fees for pay TDMB services. The various encryption keys may be implemented by a service provider, network operator or broadcasting station. Hereinafter, the encryption key provision and the fee charging for pay TDMB services will be explained in more detail.

A provider of the wireless communication network 20 manages encryption keys received from the broadcasting station 30, and provides the encryption keys, which may be based on a user's requested amount, to the TDMB phone 10. Hence, the user of the TDMB phone 10 may decrypt the encrypted TDMB data for viewing a corresponding pay TDMB service. Accordingly, fee charging for the pay TDMB service can be implemented.

The fee charging for the pay TDMB service may be implemented by various methods, such as charging based on units of viewing time and charging based on specific TDMB programs, for example. If the fee charging for the pay TDMB service is implemented based on units of time, encryption keys for decrypting the encrypted TDMB data are provided to the TDMB phone 10 through the wireless communication network 20, preferably in a Short Messaging Service (SMS) format, so that the user of the TDMB phone 10 can view a particular pay TDMB program for a requested time duration. Accordingly, the wireless communication network provider generates various encryption keys and manages them according to requests received from the user of the TDMB phone 10 for viewing pay TDMB channels. The wireless communication network provider may also manage a process for charging a fee for viewing the pay TDMB services.

Alternatively, the process for charging a fee for a pay TDMB service may be implemented by the broadcasting station 30. In this case, the wireless communication network 20 serves as a physical interface for exchanging encryption keys and information regarding the fee charging between the broadcasting station 30 and the TDMB phone 10. Therefore, in response to an encryption key request from the user, the steps of extracting proper encryption keys, generating a short message, etc., may be performed in a server system of the broadcasting station 30 using a dedicated server or the like.

Hereinafter, a method for encrypting TDMB data for implementing a pay TDMB service will be explained. TDMB data transmitted from the broadcasting station 30 may have a coded division multiplex (CDM) structure based on frame data, so that encryption keys can be inserted into a portion thereof for each frame. If the transmitted TDMB data is image data of a Moving Picture Experts Group (MPEG) format, the encryption keys may be inserted into a header portion of the MPEG format to enable conditional access and thereby implement a fee charging scheme for each TDMB channel or TDMB program. Since the transmitted TDMB data has a digital data format, the process for inserting encryption keys is easily performed. Moreover, a simple public key decryption algorithm or a general public key infrastructure (PKI) may be applied to decrypt the encrypted keys.

Once the keys are decrypted, the TDMB receiver may receive the broadcast services. However, in order to prevent the TDMB receiver, having certain encryption key information, from receiving unlimited broadcast services, the broadcasting station 30 can periodically update the encryption keys inserted into a portion of a corresponding frame of the transmitted TDMB data. The period length may be set as one day, a morning, an afternoon, an evening, a unit of time, etc. Even though various time periods may be used, a period longer than one hour but shorter than one day is preferred to allow the user to watch a desired program. Accordingly, the number of encryption keys to be provided to the mobile communication terminal for TDMB service reception is variable, and a receiving authority and a charging method can be set by various methods.

Hereinafter, a method for charging a user of the TDMB phone 10 a fee for a pay TDMB program according to a viewing time will be explained as follows. The user of the TDMB phone 10 requests a desired pay TDMB channel and viewing time to the provider of the wireless communication network 20 or the broadcasting station 30 by inputting such information through the TDMB phone 10. Then, the broadcasting station 30 generates encryption keys corresponding to the requested pay channel and viewing time, and transmits the generated encryption keys to the TDMB phone 10. Preferably, the generated encryption keys are transmitted in an SMS (Short Messaging Service) format or other appropriate format, such as a Multimedia Message Service (MMS) format and E-mail. The user then receives a short message including the encryption keys to view the requested pay TDMB channel for the requested viewing time. Consequently, the user is charged a fee for the pay TDMB channel. If the encryption keys have a large size, a long message can be transmitted to the user. Otherwise, multiple short messages can be periodically transmitted to the user. In other words, the encryption keys may be transmitted in an appropriate manner according to their size.

Hereinafter, a method for charging a user of the TDMB phone 10 a fee for an encrypted TDMB service based on a viewing time duration will be explained. First, the user requests broadcast reception for specific pay TDMB channels to the wireless communication network provider or the broadcasting station 30 using the TDMB phone 10. Then, the broadcasting station 30 generates encryption keys for the specific pay TDMB channels, and transmits the encryption keys to the TDMB phone 10. Preferably, the encryption keys are transmitted in an SMS (Short Messaging Service) format or other appropriate format, such as a Multimedia Message Service (MMS) format and E-mail.

When the user selects the pay TDMB channels to view by operating the TDMB receiver, the amount of time spent for viewing the pay TDMB channels is measured (counted) by the TDMB phone 10. The counted time information is then provided to the wireless communication network provider or the broadcasting station 30 through the wireless communication network 20. Consequently, the user is charged a fee for the time spent viewing the TDMB channels. Preferably, a short message including encryption keys is periodically provided to the TDMB phone 10, wherein the period can be set by the user.

Figure 2:
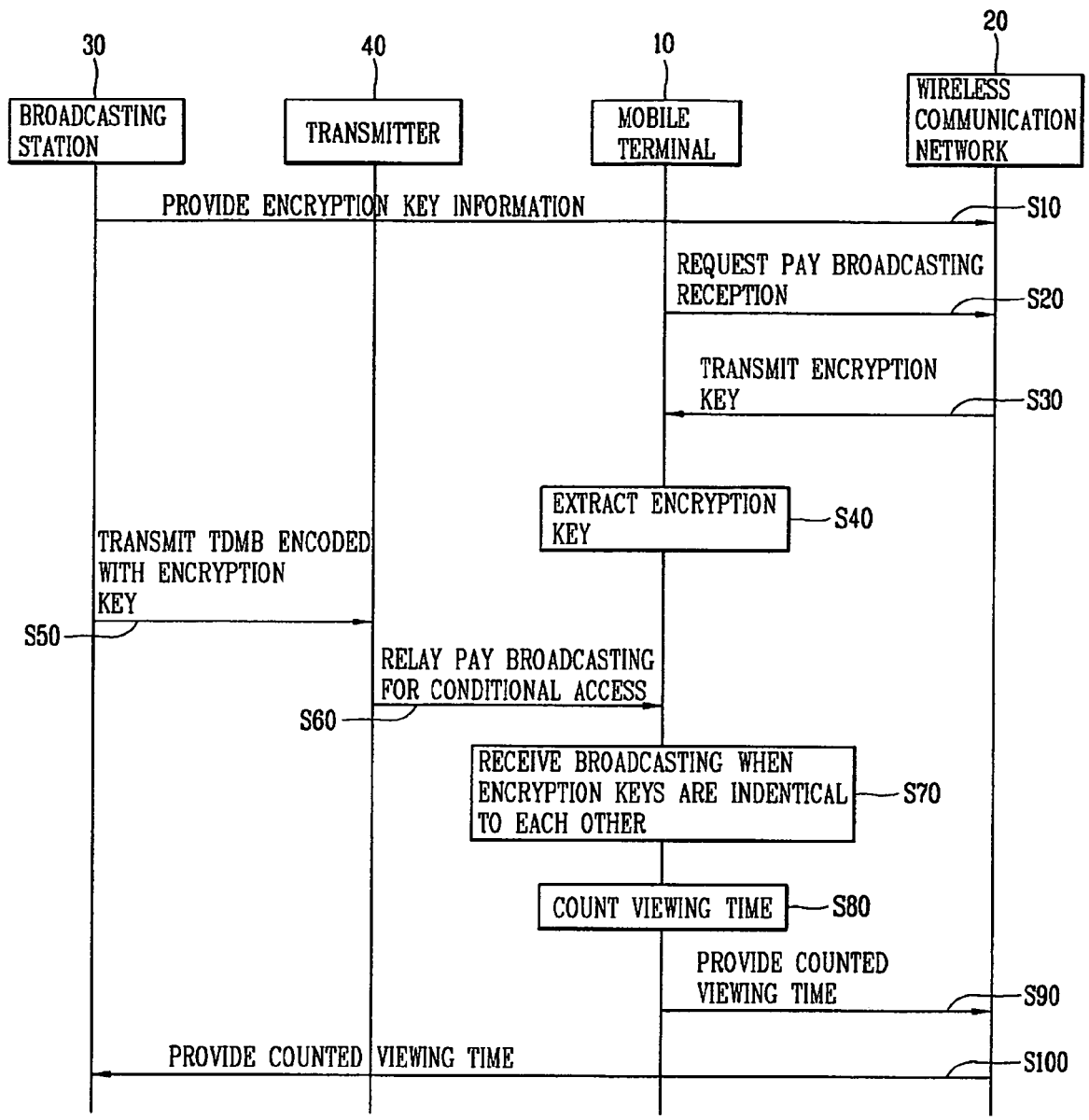
FIG. 2 is a flowchart illustrating an operation of the TDMB system for charging a fee for broadcast channel reception in accordance with a preferred embodiment of the present invention.

FIG. 2 is a flowchart illustrating an operation of the TDMB system for charging a fee for broadcast channel reception in accordance with one embodiment of the present invention. As shown in FIG. 2, the wireless communication network 20 performs a process in response to an encryption key request from the TDMB phone 10 and performs a fee charging process. Preferably, the fee charging is performed according to the amount of time spent by a user of the TDMB phone 10 for viewing a pay TDMB program or service. However, the fee charging may be based on various other methods, such as a pay-per-channel or pay-per-view scheme, for example.

First, the broadcasting station 30 generates encryption keys to be inserted into broadcasting channels and provides the encryption keys to the wireless communication network 20 (S10). Then, if the user of the TDMB phone accesses the wireless communication network 20 to request broadcast reception of pay TDMB channels (S20), the wireless communication network 20 provides encryption keys for viewing the pay TDMB channels to the TDMB phone 10 (S30). Preferably, the encryption keys are provided in a short message format, for example. Although FIG. 2 shows that the encryption keys are provided to the TDMB phone 10 only once, the encryption keys may be provided a plurality of times, such as in a periodic manner.

The TDMB phone 10 that has received the short message extracts the encryption keys from the short message and stores them (S40). If the broadcasting station 30 transmits pay TDMB channels with encryption keys inserted thereto for conditional access (S50), the TDMB transmitter 40 may relay the pay TDMB channels to the TDMB phone 10 (S60).

The user then operates the TDMB receiver within the TDMB phone 10 to select the pay TDMB channels. Next, the user decrypts the encryption keys inserted into a corresponding frame or header of a corresponding data format of a pay TDMB channel currently being provided to the TDMB phone 10 using the stored encryption keys received from the wireless communication network 20. Accordingly, the pay TDMB channel(s) may be viewed.

Also, the TDMB phone 10 measures (counts) the amount of time the user spends for viewing the pay TDMB channels (S80). As described below, this information is provided to the wireless communication network 20 for fee charging purposes (S90).

Notably, if the encryption keys inserted into the frame of the pay TDMB channel are not consistent with the encryption keys received from the wireless communication network 20 (S70), the user loses authority to receive the corresponding channel. Thus, the corresponding broadcast channel cannot be viewed.

When reception of the pay TDMB channels is completed, the measured (counted) amount of time the channel is viewed is provided to the wireless communication network 20 (S90). The wireless communication network provider then uses the counted viewing time as a reference value for charging a fee, and provides the counted viewing time to the broadcasting station 30 (S100). Preferably, the broadcasting station 30 utilizes the counted viewing time as viewing time information per individual user or viewing time information regarding multiple users for a corresponding channel. Alternatively, some other type of fee charging method may be used for charging the user(s). Accordingly, the broadcasting station 30 obtains a reference for controlling the fee, and becomes aware of the total fee that the wireless communication provider 20 has charged.

In the present invention, when the broadcasting station transmits encryption TDMB data encrypted by inserting encryption keys to the TDMB data for achieving conditional access, a mobile communication terminal such as the TDMB phone 10 receives encryption keys for decrypting the encryption TDMB data from the wireless communication network, to thereby allow the user to view his desired TDMB channel. Details regarding a fee charging method, a period or a time point for providing encryption keys, a service subject, etc. can be variously changed if necessary.

Figure 3:
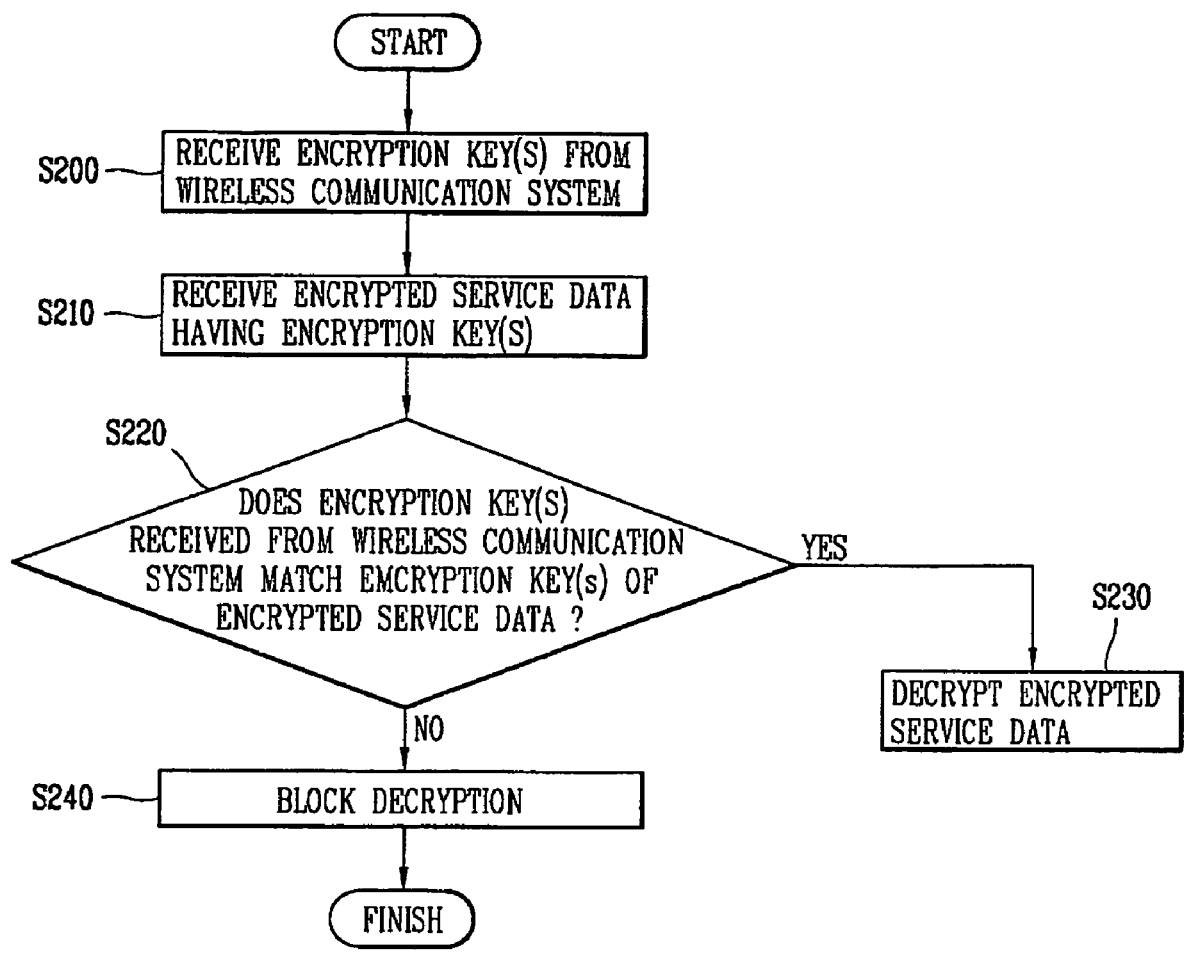
FIG. 3 illustrates a method for decrypting encrypted service data in accordance with a preferred embodiment of the present invention.

Referring to FIG. 3, a method for decrypting encrypted service data is illustrated. As shown, the mobile terminal receives at least one encryption key from the wireless communication network for decrypting encrypted service data (S200). The mobile terminal also receives encrypted service data having at least encryption key from the broadcast station (S210). The mobile terminal then compares the at least one encryption key received from the wireless communication network to the at least one encryption key of the encrypted service data (S220). If the at least one encryption key received from the wireless communication network matches the at least one encryption key of the encrypted service data, then the mobile terminal decrypts the encrypted service data (S230). However, if the at least one encryption key received from the wireless communication network does not match the at least one encryption key of the encrypted service data, then the mobile terminal blocks the encrypted service data from being decrypted (S240).

Figure 4:
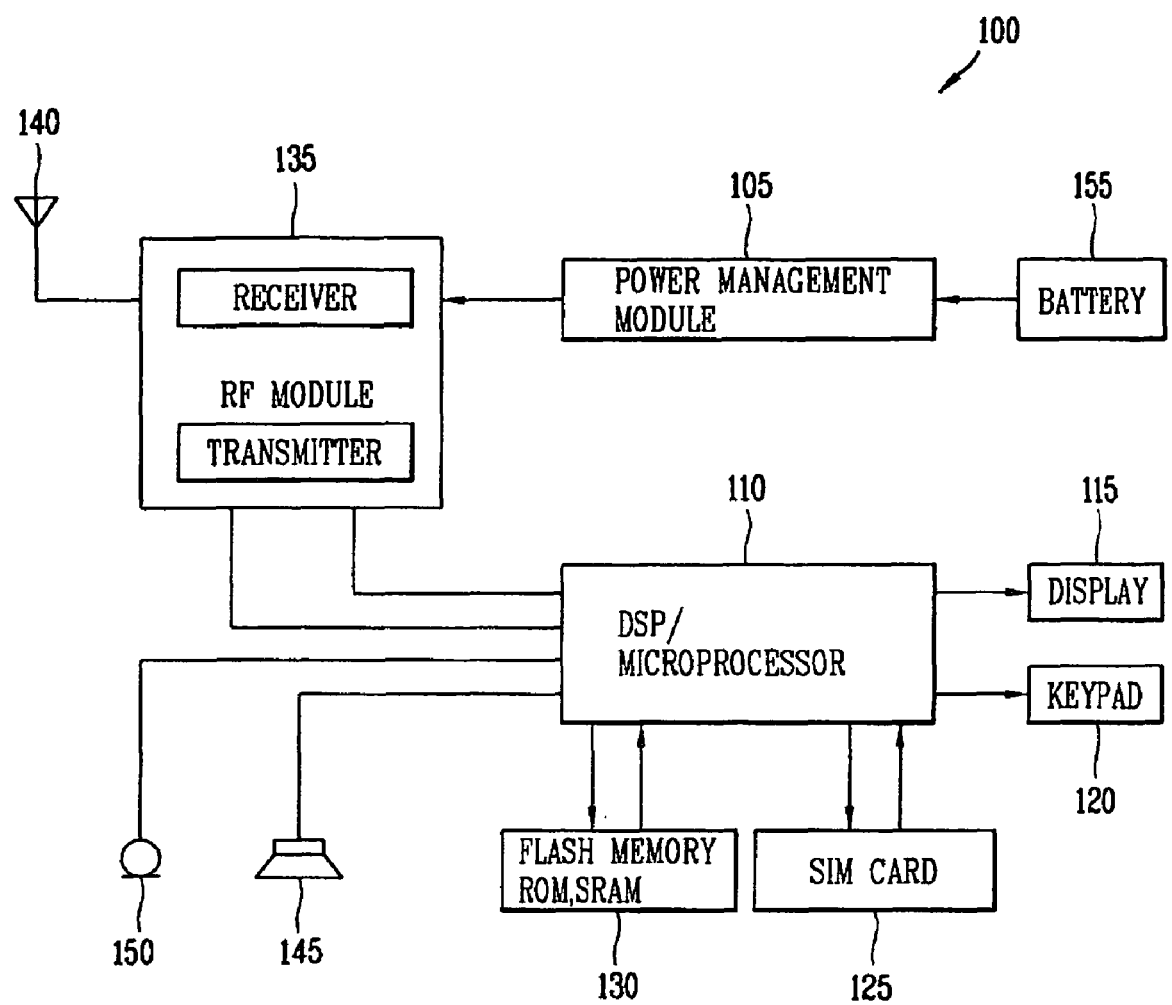
FIG. 4 is a block diagram of a mobile communication device for performing methods in accordance with a preferred embodiment of the present invention.

Referring to FIG. 4, a block diagram of a mobile communication device 100 of the present invention is illustrated, for example a mobile phone for performing the methods of the present invention. The mobile communication device 100 comprises a processing unit 110 such as a microprocessor or digital signal processor, an RF module 135, a power management module 105, an antenna 140, a battery 155, a display 115, a keypad 120, a storage unit 130 such as flash memory, ROM or SRAM, a speaker 145 and a microphone 150. A SIM card 125 is optional.

A user enters instructional information, such as a telephone number, for example, by pushing the buttons of a keypad 120 or by voice activation using the microphone 150. The processing unit 110 receives and processes the instructional information to perform the appropriate function, such as to dial the telephone number. Operational data may be retrieved from the storage unit 130 to perform the function. Furthermore, the processing unit 110 may display the instructional and operational information on the display 115 for the user's reference and convenience.

The processing unit 110 issues instructional information to the RF module 135, to initiate communication, for example, transmit radio signals comprising voice communication data. The RF module 135 comprises a receiver and a transmitter to receive and transmit radio signals. The antenna 140 facilitates the transmission and reception of radio signals. Upon receiving radio signals, the RF module 135 may forward and convert the signals to baseband frequency for processing by the processing unit 110. The processed signals would be transformed into audible or readable information outputted via the speaker 145, for example.

The processing unit 110 is adapted to store message history data of messages received from and messages transmitted to other users in the storage unit 130, receive a conditional request for message history data input by the user, process the conditional request to read message history data corresponding to the conditional request from the storage unit, and output the message history data to the display unit 115. The storage unit 130 is adapted to store message history data of the received messages and the transmitted messages.

Also, the present invention provides a mobile communication terminal, comprising a transceiver to send and receive signals with a broadcasting network and with a communication network, and a terrestrial digital multimedia broadcasting receiver cooperating with the transceiver to perform the steps of, requesting, to the communication network, access to a pay-per-view broadcasting channel, receiving, from the communication network, an encryption key related to the requested pay-per-view broadcasting channel, receiving, from the broadcasting network, encrypted terrestrial digital multimedia broadcasting data of the pay-per-view broadcasting channel, and decrypting the received terrestrial digital multimedia broadcasting data by using the previously received encryption key related to the requested pay-per-view broadcasting channel.

Here, the encryption key can be received from the communication network via a short messaging service, and the communication network previously received the encryption key from the broadcasting network. Also, the terrestrial digital multimedia broadcasting receiver can further perform the steps of determining a time duration of receiving the encrypted terrestrial digital multimedia broadcasting data, and informing the broadcasting network, via the communication network, of the determined time duration to allow a fee to be charged based upon the determined time duration. The broadcasting network can be a terrestrial digital multimedia broadcasting network, and the communication network can be a wireless access communication network.

As aforementioned, in the present invention, as the broadcasting station transmits the encryption TDMB data, a control access for charging a fee for each TDMB channel is performed. Therefore, if the receiver of the TDMB phone has no encryption key for decrypting the encryption TDMB data transmitted from the broadcasting station, the receiver can not receive the corresponding pay TDMB channel (program). That is, only a mobile communication terminal that can decrypt the encryption TDMB data by receiving the encryption keys from the broadcasting station or the wireless communication network can receive the pay TDMB channels.

In the present invention, the conditional access is performed as the broadcasting station transmits encryption TDMB data, so that a design of the mobile communication terminal having complicated TDMB receiving functions need not be changed or any required changes would be minimal. Also, the broadcasting station provides pay TDMB service of a high quality to the user thereby to generate a new profitable business model, and the user receives the pay TDMB service of high quality through the TDMB receiver.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for decrypting digital multimedia broadcast data in a mobile communication terminal, the method comprising:
   requesting encrypted digital multimedia broadcast data via a digital broadcasting network;
   receiving a message in a message service format, the message comprising a key for decrypting the encrypted digital multimedia broadcast data and received via a wireless cellular communication network in response to the request for the encrypted digital multimedia broadcast data;
   extracting the key from the received message;
   receiving the encrypted digital multimedia broadcast data;
   decrypting the encrypted digital multimedia broadcast data using the extracted key;
   displaying broadcast content associated with the decrypted digital multimedia broadcast data, monitoring fee charging information associated with the digital multimedia broadcast data; and providing the fee charging information to a fee charging authority to allow a fee to be charged based on the fee charging information, wherein the fee to be charged is based on a number of channels on which the digital multimedia broadcast data is provided.

2. The method of claim 1, wherein the extracted key is an encryption key.

3. The method of claim 1, wherein the extracted key is based on a Public Key Infrastructure.

4. The method of claim 1, wherein decrypting the encrypted digital multimedia broadcast data utilizes a conditional access function of Eureka-147.

5. The method of claim 1, wherein the message service format comprises a short message service (SMS) format, a multimedia message format (MMS), or an E-Mail.

6. The method of claim 1, wherein the encrypted digital multimedia broadcast data comprises an encryption key that is periodically updated.

7. The method of claim 1, wherein the digital multimedia broadcast data is a pay-per-view service.

8. The method of claim 1, wherein the digital broadcasting network provides broadcasting data to a plurality of mobile communication terminals operable within the broadcasting network.

9. The method of claim 1, further comprising:

measuring an amount of time for displaying the broadcast content, and providing the amount of time to the wireless cellular communication network.

10. A mobile terminal for decrypting digital multimedia broadcast data, the mobile terminal comprising:

an input unit configured to request encrypted digital multimedia broadcast data;

a broadcast network receiver configured to receive the requested encrypted digital multimedia broadcast data via a digital broadcasting network;

a wireless communication network receiver configured to receive from a wireless a message comprising a key for decrypting the received encrypted digital multimedia broadcast data, the message received via a wireless cellular communication network;

a controller configured to extract the key from the received message prior to receiving the encrypted digital multimedia broadcast data and to decrypt the encrypted digital multimedia broadcasting data using the extracted key; and a display configured to display broadcast content associated with the decrypted digital multimedia broadcast data, wherein the message is in a message service format, wherein the message is received in response to the request for the encrypted digital multimedia broadcast data wherein the controller is further configured to monitor fee charging information associated with the digital multimedia broadcast data and provide fee charging information to a fee charging authority to allow a fee to be charged based on the fee charging information, and wherein the fee to be charged is based on a number of channels on which the digital multimedia broadcast data is provided.

11. The mobile terminal of claim 10, wherein the extracted key is an encryption key.

12. The mobile terminal of claim 10, wherein the extracted key is based on a Public Key Infrastructure.

13. The mobile terminal of claim 10, wherein decrypting the received encrypted digital multimedia broadcast data utilizes a conditional access function of Eureka-147.

14. The mobile terminal of claim 10, wherein the message service format comprises a short message service (SMS) format, a multimedia message format (MMS), or an E-Mail.

15. The mobile terminal of claim 10, wherein the encrypted digital multimedia broadcast data comprises an encryption key that is periodically updated.

16. The mobile terminal of claim 10, wherein the controller is further configured to measure an amount of time for the displaying the broadcast content, and to initiate the wireless communication network receiver to provide the amount of time to the wireless communication network.

17. A system for decrypting digital multimedia broadcast data, the system comprising:

a broadcast network transmitter configured to transmit encrypted digital multimedia broadcast data via a digital broadcasting network in response to a request for the encrypted digital multimedia broadcast data;

a wireless network transmitter configured to transmit a key for decrypting the encrypted digital multimedia broadcast data via a wireless cellular communication network in response the request for the encrypted digital multimedia broadcast data; and a mobile terminal configured to receive a message in a message service format, the message comprising the key for decrypting the encrypted digital multimedia broadcast data and received via a wireless cellular communication network, to extract the key from the message prior to receiving the encrypted digital multimedia broadcast data, to decrypt the encrypted digital multimedia broadcast data using the extracted key, and to display broadcast content associated with the decrypted digital multimedia broadcasting data wherein the mobile communication terminal is further configured to monitor fee charging information associated with the digital multimedia broadcast data and provide fee charging information to a fee charging authority to allow a fee to be charged based on the fee charging information, and wherein the fee to be charged is based on a number of channels on which the digital multimedia broadcast data is provided.

18. The system of claim 17, wherein the extracted key is an encryption key.

19. The system of claim 17, wherein the extracted key is based on a Public Key Infrastructure.

20. The system of claim 17, wherein decrypting the encrypted digital multimedia broadcast data utilizes a conditional access function of Eureka-147.

21. The system of claim 17, wherein the message service format comprises at least a short message service (SMS) format, a multimedia message format (MMS), or an E-Mail.

22. The system of claim 17, wherein the encrypted digital multimedia broadcast data comprises an encryption key that is periodically updated.

23. The system of claim 17, wherein the mobile terminal is further configured to measure an amount of time for the displaying the broadcast content and to provide the amount of time to the wireless communication network.

* * * * *